United States Patent

Jha et al.

(10) Patent No.: US 9,992,744 B2
(45) Date of Patent: Jun. 5, 2018

(54) MECHANISMS TO OPTIMIZE AND ALIGN DISCONTINUOUS RECEPTION CONFIGURATION OF DEVICE TO-DEVICE CAPABLE USER EQUIPMENT

(71) Applicant: Intel Corporation, Santa Clara, CA (US)

(72) Inventors: Satish Chandra Jha, Hillsboro, OR (US); Ali Taha Koc, Portland, OR (US); Kathiravetpillai Sivanesan, Richardson, TX (US); Mohammad Mamunur Rashid, Hillsboro, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 67 days.

(21) Appl. No.: 14/581,205

(22) Filed: Dec. 23, 2014

(65) Prior Publication Data

US 2015/0245295 A1 Aug. 27, 2015

Related U.S. Application Data

(60) Provisional application No. 61/943,984, filed on Feb. 24, 2014.

(51) Int. Cl.
*H04W 52/02* (2009.01)
*H04W 76/04* (2009.01)

(52) U.S. Cl.
CPC ... *H04W 52/0241* (2013.01); *H04W 52/0206* (2013.01); *H04W 76/048* (2013.01);
(Continued)

(58) Field of Classification Search
None
See application file for complete search history.

(56) References Cited

U.S. PATENT DOCUMENTS

2009/0280802 A1 11/2009 Chin et al.
2010/0303039 A1 12/2010 Zhang et al.
(Continued)

FOREIGN PATENT DOCUMENTS

KR 20110018896 2/2011

OTHER PUBLICATIONS

International Search Report and Written Opinion of the International Searching Authority for International Application No. PCT/US2015/015619, dated Jun. 1, 2015, 26 pages.
(Continued)

*Primary Examiner* — Steven H Nguyen
(74) *Attorney, Agent, or Firm* — Green, Howard & Mughal LLP.

(57) ABSTRACT

An Evolved Node-B (eNB) to communicate with a User Equipment (UE) on a Long Term Evolution (LTE) network, the eNB comprising: a first logic to determine whether a UE is capable of receiving and transmitting data at substantially the same time or receiving data at two different frequencies at the same time; and a second logic to configure for the UE a Discontinuous Reception (DRX) configuration such that a DRX ON duration overlaps with a discovery opportunity duration (DOD) according to the determination from the first logic. In another example, the eNB comprises: logic to configure for the UE a DRX configuration such that a DRX ON duration window abuts with a DOD window according to the determination from the first logic. In another example, the eNB operable to perform a method comprising: configuring, for a UE, a DRX configuration such that a DRX ON duration overlaps with a DOD.

22 Claims, 14 Drawing Sheets

(52) U.S. Cl.
CPC .......... *Y02D 70/00* (2018.01); *Y02D 70/1224* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/166* (2018.01); *Y02D 70/21* (2018.01); *Y02D 70/24* (2018.01)

(56) References Cited

U.S. PATENT DOCUMENTS

| | | | | |
|---|---|---|---|---|
| 2011/0237231 | A1* | 9/2011 | Horneman | H04W 76/048 455/414.1 |
| 2011/0268004 | A1* | 11/2011 | Doppler | H04W 72/02 370/311 |
| 2012/0044822 | A1 | 2/2012 | Kim et al. | |
| 2012/0164948 | A1 | 6/2012 | Narasimha et al. | |
| 2013/0122893 | A1* | 5/2013 | Turtinen | H04W 8/005 455/423 |
| 2013/0170398 | A1* | 7/2013 | Kwon | H04W 8/005 370/255 |
| 2013/0170414 | A1* | 7/2013 | Kwon | H04W 72/042 370/311 |
| 2013/0229931 | A1 | 9/2013 | Kim | |
| 2015/0055532 | A1* | 2/2015 | Lu | H04W 52/0225 370/311 |
| 2015/0098416 | A1* | 4/2015 | Kuo | H04W 72/10 370/329 |
| 2015/0111586 | A1* | 4/2015 | Sorrentino | H04W 72/042 455/450 |
| 2016/0044740 | A1* | 2/2016 | Siomina | H04W 76/048 455/552.1 |
| 2016/0219443 | A1* | 7/2016 | Lee | H04W 24/02 |
| 2016/0262100 | A1* | 9/2016 | Larsson | H04W 48/16 |

OTHER PUBLICATIONS

International Preliminary Report on Patentability for International Patent Application No. PCT/US2015/015619, dated Sep. 9, 2016.
Extended Search Report for European Patent Application No. 15752721.9 dated Sep. 21, 2017.
Office Action for Japanese Patent Application No. 2016-546046 dated Sep. 15, 2017.
Office Action for Korean Patent Application No. 2016-7020094 dated Oct. 30, 2017.
General Dynamics Broadband, "Discussion on D2D direct discovery", 3GPP; R2-132434; TSG-RAN #83, Barcelona, Spain Aug. 19-23, 2013.
Intel Corporation, "Further discussion on interrruption requirements for D2D", 3GPP; R4-147708; TSG-RAN WG4 Meeting #73; San Francisco, CA, USA; Nov. 21, 2014.
Qualcomm, "Further Discussion on ProSe Capability Signaling", 3GPP; R2-144537; TSG-RAN WG2 #87bis; Shanghai, China; Oct. 10, 2014.
Samsung, "Discovery Monitoring in RRC Connected State", 3GPP; R2-142200; TSG RAN WG2 Meeing #86; Seoul, South Korea; May 19-23, 2014.
Zte, "Considerations on D2D Proximity Discovery", 3GPP; R2-132680; TSG-RAN WG2 Meeting #83, Barcelona, Spain Aug. 19-23, 2013.
Office Action for Korean Patent Application No. 2016-7020094, dated Apr. 12, 2017.
Notice of Allowance for Japanese Patent Application No. 2016-546046, dated Mar. 13, 2018. Translation provided.

* cited by examiner

800

```
-- ASN1START

UL-DCCH-Message ::= SEQUENCE {
    message                    UL-DCCH-MessageType
}

UL-DCCH-MessageType ::= CHOICE {
    c1                         CHOICE {
        csfbParametersRequestCDMA2000        CSFBParametersRequestCDMA2000,
        measurementReport                    MeasurementReport,
        rrcConnectionReconfigurationComplete RRCConnectionReconfigurationComplete,
        rrcConnectionReestablishmentComplete RRCConnectionReestablishmentComplete,
        rrcConnectionSetupComplete           RRCConnectionSetupComplete,
        securityModeComplete                 SecurityModeComplete,
        securityModeFailure                  SecurityModeFailure,
        ueCapabilityInformation              UECapabilityInformation,
        ulHandoverPreparationTransfer        ULHandoverPreparationTransfer,
        ulInformationTransfer                ULInformationTransfer,
        counterCheckResponse                 CounterCheckResponse,
        ueInformationResponse-r9             UEInformationResponse-r9,
        proximityIndication-r9               ProximityIndication-r9,
        rnReconfigurationComplete-r10        RNReconfigurationComplete-r10,
        mbmsCountingResponse-r10             MBMSCountingResponse-r10,
        interFreqRSTDMeasurementIndication-r10 InterFreqRSTDMeasurementIndication-r10
    },
    messageClassExtension  CHOICE {
        c2                         CHOICE {
            ueAssistanceInformation-r11     UEAssistanceInformation-r11,
            inDeviceCoexIndication-r11      InDeviceCoexIndication-r11,
            mbmsInterestIndication-r11      MBMSInterestIndication-r11,
            ueAssistanceInformation-r12     UEAssistanceInformation-r12,
            spare12 NULL, spare11 NULL, spare10 NULL,
            spare9 NULL, spare8 NULL, spare7 NULL,
            spare6 NULL, spare5 NULL, spare4 NULL,
            spare3 NULL, spare2 NULL, spare1 NULL
        },
        messageClassExtensionFuture-r11    SEQUENCE {}
    }
}

-- ASN1STOP
```

```
-- ASN1START

UEAssistanceInformation-r12 ::=        SEQUENCE {
    criticalExtensions              CHOICE {
        c1                              CHOICE {
            ueAssistanceInformation-r12     UEAssistanceInformation-r12-IEs,
            spare3 NULL, spare2 NULL, spare1 NULL
        },
        criticalExtensionsFuture        SEQUENCE {}
    }
}

UEAssistanceInformation-r12-IEs ::=     SEQUENCE {
    discoverySpecificDRXPreference-r12  ENUMERATED {True,False}  OPTIONAL,
    lateNonCriticalExtension            OCTET STRING             OPTIONAL,
    nonCriticalExtension                SEQUENCE {}              OPTIONAL
}

-- ASN1STOP
```

```
-- ASN1START

UEAssistanceInformation-r11 ::=       SEQUENCE {
    criticalExtensions                CHOICE {
        c1                            CHOICE {
            ueAssistanceInformation-r11   UEAssistanceInformation-r11-IEs,
            spare3 NULL, spare2 NULL, spare1 NULL
        },
        criticalExtensionsFuture      SEQUENCE {}
    }
}

UEAssistanceInformation-r11-IEs ::=   SEQUENCE {
    powerPrefIndication-r11           ENUMERATED {normal, lowPowerConsumption}  OPTIONAL,
    ueAssistanceInformation-r12       UEAssistanceInformation-r12-IEs,   OPTIONAL,  --NEED ON
}

UEAssistanceInformation-r12-IEs ::=   SEQUENCE {
    discoverySpecificDRXPreference-r12    ENUMERATED {True,False}   OPTIONAL,
    lateNonCriticalExtension          OCTET STRING                  OPTIONAL,
    nonCriticalExtension              SEQUENCE {}                   OPTIONAL
}

-- ASN1STOP
```

MECHANISMS TO OPTIMIZE AND ALIGN DISCONTINUOUS RECEPTION CONFIGURATION OF DEVICE TO-DEVICE CAPABLE USER EQUIPMENT

CLAIM OF PRIORITY

The present application claims priority under 35 U.S.C. § 119(e) to U.S. Provisional Patent Application Ser. No. 61/943,984 filed Feb. 24, 2014, and which is incorporated by reference in its entirety.

BACKGROUND

In Long Term Evolution (LTE) networks, mobile applications and their corresponding higher data rate requirements are the latest phenomenon causing a tremendous need in power saving for mobile devices. Discontinuous Reception (DRX) is a method by which a User Equipment (UE) can switch off its receiver for a period of time, thus saving energy, while remaining in the Radio Resource Control (RRC) Connected state (or mode). DRX in Connected mode is a power saving mechanism in LTE networks. Since DRX saves battery power of the UE, usually at the expense of potential increase in latency, an optimization is needed to find the best tradeoff between latency and power savings.

Device-to-Device (D2D) Proximity Service (ProSe) capable UEs are UEs that can communicate with one another. Radio resource allocation and management is needed for D2D discovery for in-coverage scenarios. During the discovery time duration, which occurs periodically in the order of seconds, the D2D ProSe UEs may be either transmitting or receiving the discovery signals. Therefore, UEs are active and thus consuming power during discovery opportunity duration irrespective of the LTE states (i.e., idle or connected mode DRX States).

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIGS. 8A-B illustrate an Uplink Radio Resource Control (RRC) message for a ProSe UE to request or indicate its preference for discovery specific DRX Configuration, according to some embodiments of the disclosure.

FIG. 9 illustrates an Uplink RRC Information Element (IE) for a ProSe UE to request or indicate its preference for discovery specific DRX Configuration, according to some embodiments of the disclosure.

DETAILED DESCRIPTION

Figure 1:
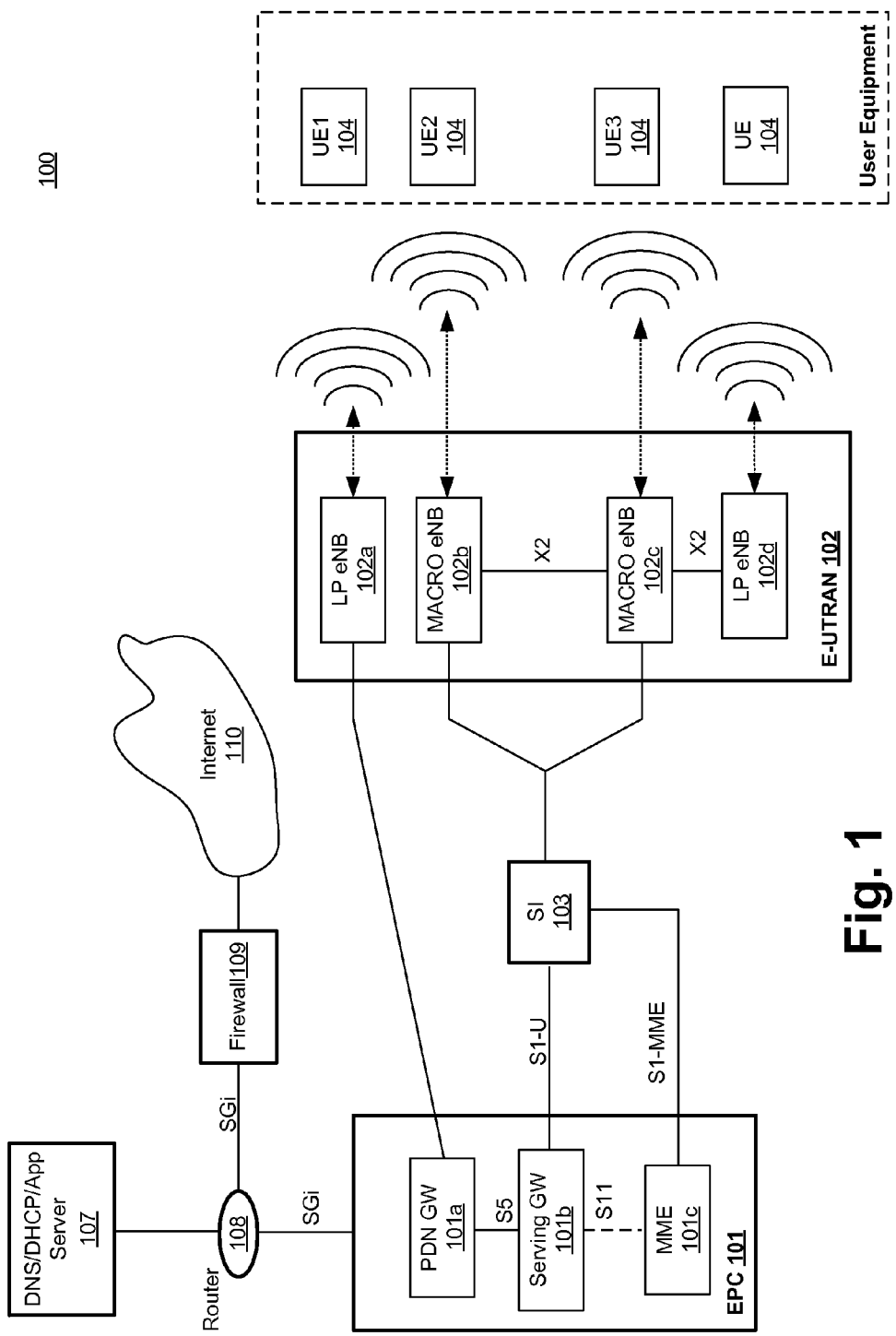
FIG. 1 illustrates a portion of an end-to-end network architecture of a Long Term Evolution (LTE) network with various components of the network with optimized Discontinuous Reception (DRX) configurations, according to some embodiments of the disclosure.

The Long Term Evolution (LTE) system is composed of an Evolved Universal Terrestrial Radio Access Network (E-UTRAN), a User Equipment (UE), and an Evolved Packet Core (EPC). Here, UE is any device used directly by an end-user to communicate. It can be a handheld telephone, a laptop computer equipped with a mobile broadband adapter, or any other similar device. A UE connects to the base station Node B/eNodeB (or eNB) as specified in the European Telecommunications Standards Institute (ETSI) 125/136-series and 3GPP 25/36-series of specifications. A UE roughly corresponds to the Mobile Station (MS) in Global System for Mobile Communications (GSM) systems.

Device-to-Device (D2D) discovery is a mechanism which enables a device (i.e., a Proximity Service (ProSe) capable device) to discover other devices with matching services and interest in its proximity. A device (i.e., UE) which wants to be discovered by other devices transmits a discovery signal in a specified resource pool while other ProSe capable UEs in the proximity listen to and/or receive the discovery signal to discover the former (i.e., device transmitting discovery signal). Therefore, the transmitting or receiving devices (i.e., UEs) know the common resource pool (e.g., frequency and time slots in the LTE network) for D2D discovery. During discovery opportunity duration (here, also referred as DOD) and irrespective of LTE states (i.e., idle or connected mode DRX states), UEs are active and consume power. Various embodiments described here reduce UE power consumption by optimizing DRX configuration.

In some embodiments, DRX configuration in Connected Mode is optimized to improve the UE power saving for ProSe capable UEs. In some embodiments, ProSe UEs can increase the power saving by aligning or customizing the DRX configuration based on discovery resource allocation in a cell. For example, ProSe capable UEs may have long DRX cycles between the periodic DODs while shorter DRX cycle (or no DRX sleep by setting Inactivity Timer (or DRX ON duration) equal to DOD) during DOD. In some embodiments, DRX cycle and drx_StartOffset (i.e., a time offset after DRX timer expiration and before DRX begins) can be aligned in such a way that discovery periodicity and DRX cycle are equal or integer multiples of each other and end of DRX long cycle (i.e. start of DRX ON duration) can be aligned with the start of DOD.

In some embodiments, if ProSe capable UEs are not expected to listen to the LTE Physical Downlink Control Channel (PDCCH) during discovery opportunity, then the DRX configuration and the Discovery Periodicity (DP) are aligned in such a way that the DRX ON duration either finishes right before or starts right after the DOD. In some embodiments, a ProSe capable UE may send a user assistance message or indication to the network to be configured with discovery specific DRX configuration.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical or wireless connection between the things that are connected, without any intermediary devices. The term "coupled" means either a direct electrical or wireless connection between the things that are connected or an indirect connection through one or more passive or active intermediary devices. The meaning of "a," "an," and "the" include plural references. The meaning of "in" includes "in" and "on."

The terms "substantially," "close," "approximately," "near," and "about," generally refer to being within +/−20% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

FIG. 1 illustrates a portion of an end-to-end network architecture 100 of an LTE network with various components of the network to provide optimized DRX configurations, according to some embodiments of the disclosure.

In some embodiments, network 100 comprises core network 101, Radio Access Network (RAN) 102, Interface 103, Dynamic Host Configuration Protocol (DHCP) Application (App.) Server or Domain Name System (DNS) App. Server 107, Router 108, Firewall 109, and Internet 110.

An example of core network 101 is an Evolved Packet Core (EPC), also referred to as System Architecture Evolution (SAE) core. An example of RAN 102 is Evolved Universal Mobile Telecommunications System (UMTS) Terrestrial Radio Access Network (E-UTRAN). An example of interface 103 is an SI interface. So as not to obscure the various embodiments, only a section of the core network 101, as well as the RAN 102, is illustrated. Core network 101 includes Packet Data Network Gateway (PDN GW) 101a, Serving Gateway (serving GW, or SGW) 101b, and Mobility Management Entity (MME) 101c. The interface between PDN GW 101a and SGW 101b is S5. The interface between SGW 101b and MME 101c is S11.

PDN GW 101a (which is also referred to here as PGW) terminates a SGi interface toward the packet data network (PDN). PDN GW 101a routes data packets between EPC 101 and the external PDN (not shown), and may be a key node for policy enforcement and charging data collection. It may also provide an anchor point for mobility with non-LTE network accesses. The external PDN can be any kind of Internet Protocol (IP) network, as well as an IP Multimedia Subsystem (IMS) domain. In some embodiments, PDN GW 101a and Serving GW 124 may be realized in one physical node. In some embodiments, PDN GW 101a and Serving GW 124 may be realized into separate physical nodes.

Serving GW 101b (which is also referred to here as SGW) terminates the interface toward RAN 102. In addition, SGW 101b routes data packets between RAN 102 and core network 101. SGW 101b may be a local anchor point for handovers between the eNBs.

MME 101c is similar in function to the control plane of legacy Serving General Packet Radio Service (GPRS) Support Nodes (SGSN). MME 101c manages mobility aspects in access such as gateway selection and tracking area list management. SGW 101b and MME 101c may be realized in one physical node or also in separate physical nodes.

RAN 102 (which is also referred here as E-UTRAN 102) includes Enhanced/Evolved Node B's (abbreviated as eNodeB or eNB) 102a/b/c/d (which may function as base stations) for communicating with one or more UEs 104. eNBs 102a/b/c/d can comprise of MACRO eNBs 101b/c and Low Power (LP) eNBs 102a/d. An eNB is an element in E-UTRA of the LTE standard that is the evolution of the element Node B in UMTS Terrestrial Radio Access (UTRA) of UMTS. UMTS is a third generation mobile cellular system for networks based on the Global System for Mobile Communications (GSM) standard. It is the hardware that is connected to the mobile phone network that communicates directly with the UEs, like a Base Transceiver Station (BTS) in GSM networks. Traditionally, a Node B has minimum functionality, and is controlled by a Radio Network Controller (RNC). However, with eNB 102a, for example, there is no separate controller element. This simplifies the architecture and allows lower response times.

An eNB interfaces with the SAE core (also known as the EPC) and other eNBs. For example, eNB 102b uses the S1-AP protocol on the S1-MME interface with MME 101c for control plane traffic. An eNB also uses the GPRS Tu Tunneling Protocol (GTP-U), which is the defining IP-based protocol of the GPRS core network protocol on the S1-U interface with the SGW for user plane traffic. Collectively, the S1-MME and S1-U interfaces are known as the S1 interface 103, which represents the interface from eNB 102*b/c* to EPC 101.

The eNBs (e.g., MACRO 102*b/c* and LP 102*a/d*) conclude the air interface protocol. The eNBs may be the first point of contact for a UE 104. In some embodiments, an eNB may perform various logical roles for RAN 102 including RNC functions such as data packet scheduling, mobility management, radio bearer management, and uplink and downlink dynamic radio resource management. An embodiment of eNB 102*a/b/c/d* is described with reference to FIG. 3.

Referring back to FIG. 1, in some embodiments, UEs 104 may be arranged to communicate Orthogonal Frequency-Division Multiplexing (OFDM) communication signals with eNB 102*a/b/c/d* over a multicarrier communication channel according to an OFDM communication technique. The OFDM signals may include a myriad of orthogonal subcarriers. OFDM is a method of encoding digital data on multiple carrier frequencies.

In some embodiments, UE 104 is any device used directly by an end-user to communicate. It can be a handheld telephone, a laptop computer equipped with a mobile broadband adapter, or any other device. UE 104 connects to the base station, for example, Node B/eNodeB 102*a* as specified in the ETSI 125/136-series and 3GPP 25/36-series of specifications. UE 104 roughly corresponds to the mobile station (MS) in GSM systems. Various bearers (i.e., carriers) are used to provide End-to-End Service from the UE to the Internet, for example. An embodiment of UE 104 is described with reference to FIG. 2 and FIG. 15.

Referring back to FIG. 1, in some embodiments, S1 interface 103 is the interface that separates RAN 102 and EPC 102. S1 interface 103 is split into two parts. The first part, the S1-U carries traffic data between eNBs 102*b/c* and SGW 101*b*. The second part is the S1-MME, a signaling interface between eNBs 102*b/c* and the MME 101*c*. The X2 interface is the interface between eNBs, for example, eNB 102*b* and eNB102*c*. The X2 interface includes two parts, the X2-C and X2-U. The X2-C is the control plane interface between eNBs 101*b/c* and the X2-U is the user plane interface between eNBs 101*b/c*.

LP cells are usually used to extend coverage to indoor areas where outdoor signals do not reach well. LP cells are also used to add network capacity in areas with very heavy phone usage such as airports. The term Low Power eNB refers to any lower power eNB for implementing a narrower cell (i.e., narrower than a macro cell) such as a femtocell, picocell, or micro cell. Femtocell eNBs are normally provided by a mobile network operator to its residential or commercial customers. A femtocell is generally the size of a residential gateway. It typically connects to the user's broadband line. When the femtocell is plugged in the broadband line, it connects to the mobile operator's mobile network. The connected femtocell then provides extra coverage, for example, of 30 to 50 meters, for residential femtocells. Therefore, an LP eNB (e.g., 102*a/d*) may be a femtocell eNB since it is coupled through the PGW 101*a*.

Likewise, a picocell is a wireless communication system usually covering a small area, such as corporate offices, shopping areas, or aircrafts, etc. A picocell eNB can couple through the X2 link to another eNB. For example, picocell eNB can couple to a macro eNB through its Base Station Controller (BSC). Therefore, LP eNB (e.g., 102*a/d*) may be realized with a picocell eNB. One reason for realizing LP eNB with a picocell eNB is that the LP eNB is coupled to a macro eNB 102*c* via an X2 interface. Picocell eNBs or other LP eNBs may incorporate some or all features of a macro eNB. In some cases, picocell eNBs or other LP eNBs are referred to as an Access Point (AP) Base Station (BS) or enterprise femtocell.

In some cases, a downlink resource grid is used for downlink transmissions from an eNB 102*a/b/c/d* to a UE 104. The downlink resource grid may be a time-frequency grid. The time-frequency grid is a physical resource in the downlink in each slot. Such a time-frequency plane representation is used for OFDM systems. The time-frequency resource grid is formed of columns and rows. Each column and each row of the time-frequency resource grid correspond to one OFDM symbol and one OFDM subcarrier, respectively.

In the time domain, the duration of the time-frequency resource grid in the time domain corresponds to one slot in a radio frame. The smallest time-frequency unit in a time-frequency resource grid is designated as a resource element. Each time-frequency resource grid includes a number of resource blocks. The resource blocks describe the mapping of particular physical channels to resource elements. Each resource block includes a collection of resource elements. In the frequency domain, the collection of resource elements represent the smallest quanta of currently allowable resources. There are many different physical downlink channels which are conveyed via such resource blocks. For example, physical downlink channels can be the Physical Downlink Shared Channel (PDSCH) and the Physical Downlink Control Channel (PDCCH).

The PDSCH carries user data to UE 104. The PDSCH also carries higher-layer signaling to a UE 104 (e.g., UE1). The PDCCH carries resource allocations related to the PDSCH and information about the transport format. The PDCCH also informs UE 104 about the resource allocation, transport format, and Hybrid Automatic Repeat Request (H-ARQ) information related to the uplink shared channel. Generally, downlink scheduling (i.e., assigning control and shared channel resource blocks to UEs 104 within a cell) is performed at the eNB (e.g., one or more eNBs 102*a/b/c/d*). This downlink scheduling is based on channel quality information fed back from the UEs 104 to eNB 102*a/b/c/d*. The downlink resource assignment information is then sent to a UE 104 (e.g., UE1) on the control channel (e.g., PDCCH) which is used for (or assigned to) UE 104.

To convey the control information, the PDCCH uses Control Channel Elements (CCEs). The PDCCH complex-valued symbols are first organized into quadruplets before being mapped to resource elements. The quadruplets are then permuted using a sub-block inter-leaver for rate matching. Each PDCCH is transmitted using one or more of these CCEs. Each CCE corresponds to nine sets of four physical resource elements. These sets of physical resource elements are known as Resource Element Groups (REGs). In one example, four Quadrature Phase Shift Keying (QPSK) symbols are mapped to each REG. Depending on the size of the Downlink Control Information (DCI) and the channel condition, the signal on the PDCCH can be transmitted using one or more CCEs.

In LTE downlink, the eNB (e.g., eNB 102*a/b*) periodically transmits one or more synchronization signals and signals carrying system information. Examples of the one or more synchronization signals are Primary Synchronization Signals (PSS) and Secondary Synchronization Signals (SSS). Examples of signals carrying system information are Physical Broadcast Channel (PBCH) signals. LTE downlink transmission contains Common Reference Signals (CRS) in every sub frame even if the sub frames are empty (i.e., when no data is being transmitted).

A UE (e.g., UE 104) first acquires a Physical Cell Identifier (PCI), frame synchronization information, and time slot to read system information blocks from the eNB. If UE 104 is currently tuned to a specific frequency channel, it reads PSS to synchronize on a sub frame level. The PSS is periodically transmitted by eNB 102a. So, UE 104 is synchronized regularly (or periodically) with eNB 102a. UE 104 then reads the SSS which is located in the same sub frame as the PSS. UE 104 achieves a physical layer cell identity group number from the SSS. The SSS is periodically transmitted by eNB 102a. So, UE 104 is regularly (or periodically) synchronized with eNB 102a using the SSS. Once UE 104 knows the PCI for a given cell, it also knows the location of the cell Reference signals such as the CRS. The reference signals are used in channel estimation, cell selection, cell reselection, and handover procedures.

Figure 2:
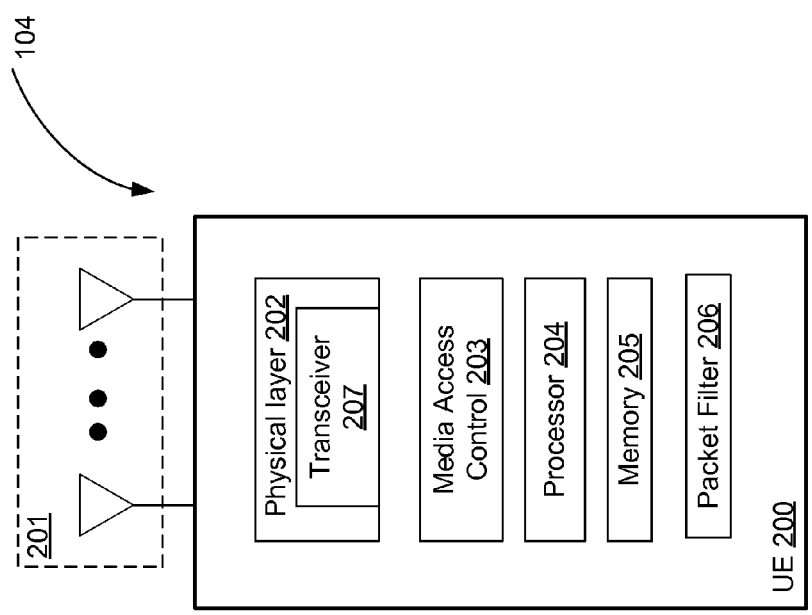
FIG. 2 illustrates a high-level block diagram of a User Equipment (UE) to operate with optimized DRX configurations, according to some embodiments of the disclosure.

FIG. 2 illustrates a high-level block diagram of a UE 200 (e.g., one of UEs 104) to operate with optimized DRX configurations, according some embodiments. It is pointed out that those elements of FIG. 2 having the same reference numbers (or names) as the elements of any other figure can operate or function in any manner similar to that described, but are not limited to such.

In some embodiments, UE 200 may include physical (PHY) layer circuitry 202, Media Access Control (MAC) circuitry 203, Processor 204, Memory 205, and Packet Filter(s) 206. So as not to obscure the embodiments, a high level simplified architecture of UE 200 is described. A person skilled in the art would appreciate that other components (not shown) are used in addition to the ones shown to form a complete UE. In some embodiments, PHY layer circuitry 202 includes Transceiver 207 for transmitting and receiving signals to and from eNB 102a/b/c/d, other eNBs. Transceiver 207 also transmits and receives signals to and from other UEs or other devices using one or more antennas 201. In some embodiments, MAC circuitry 203 controls access to the wireless medium. Processor 204 and Memory 205 are arranged to perform the operations described with reference to some embodiments.

Figure 15:
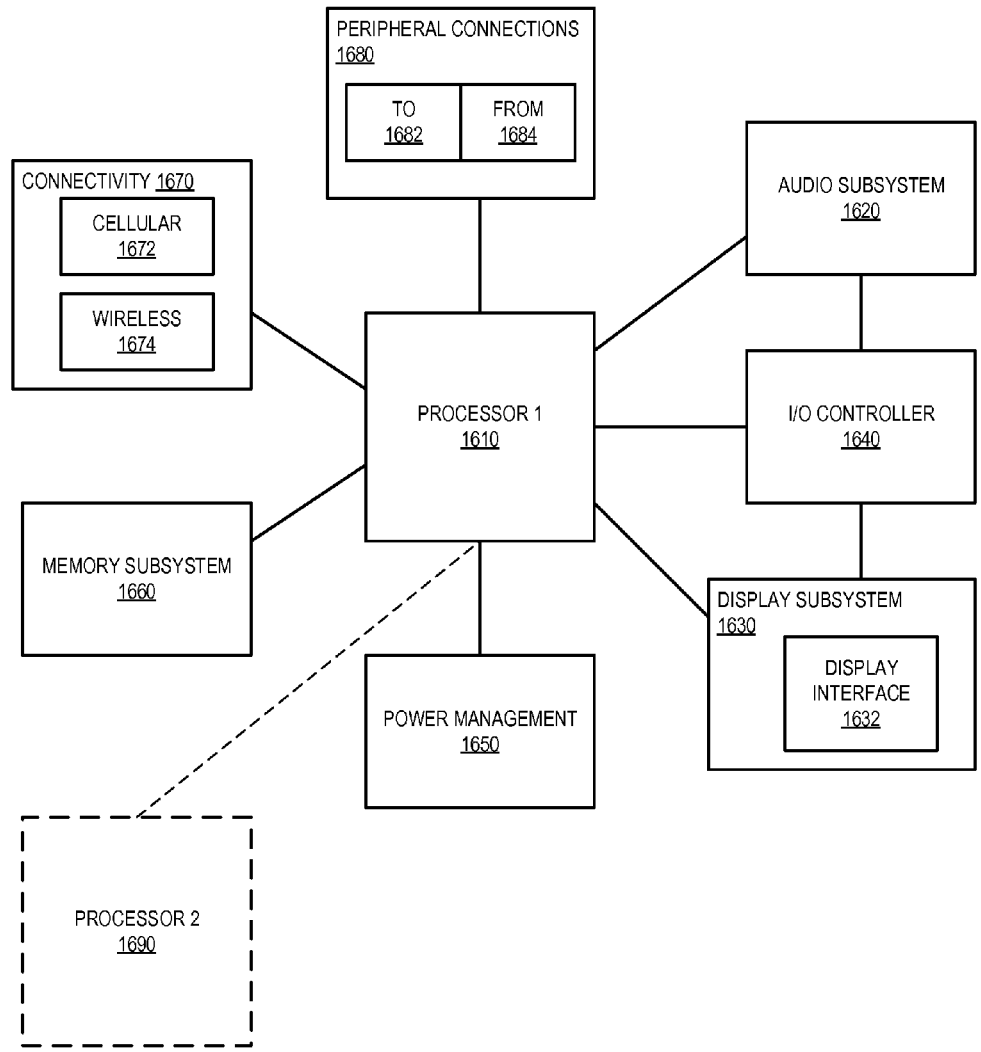
FIG. 15 illustrates a UE with apparatus for providing an eNB a preference for being configured with discovery specific DRX, according to some embodiments of the disclosure.

In some embodiments, antennas 201 may comprise one or more directional or omnidirectional antennas, including monopole antennas, dipole antennas, loop antennas, patch antennas, microstrip antennas, coplanar wave antennas, or other types of antennas suitable for transmission of Radio Frequency (RF) signals. In some multiple-input multiple-output (MIMO) embodiments, antennas 201 are separated to take advantage of spatial diversity. FIG. 15 describes another embodiment of UE 104.

Figure 3:
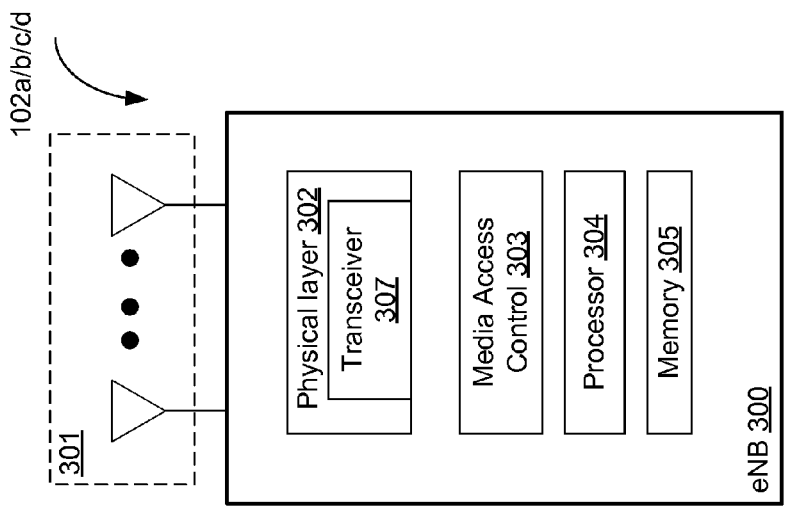
FIG. 3 illustrates an Evolved Universal Mobile Telecommunications System (UMTS) Terrestrial Radio Access Network (E-UTRAN) Node B (eNB) to provide optimized DRX configurations, according to some embodiments of the disclosure.

FIG. 3 illustrates a block diagram of eNB 300 (e.g., one of eNB 102a/b/c/d) to provide optimized DRX configurations. It should be noted that in some embodiments, eNB 300 may be a stationary non-mobile device. It is pointed out that those elements of FIG. 3 having the same reference numbers (or names) as the elements of any other figure can operate or function in any manner similar to that described, but are not limited to such.

In some embodiments, eNB 300 may include PHY layer circuitry 302, MAC circuitry 303, Processor 304, and Memory 305. So as not to obscure the embodiments, a high level simplified architecture of eNB is described. A person skilled in the art would appreciate that other components (not shown) are used in addition to the ones shown to form a complete eNB. In some embodiments, PHY layer circuitry 302 includes Transceiver 307 for transmitting and receiving signals to and from eNB 102a/b/c/d and other eNBs. Transceiver 307 also transmits and receives signals to and from other UEs or other devices using one or more antennas 301. In some embodiments, MAC circuitry 303 controls access to the wireless medium. In some embodiments, Processor 304 and Memory 305 are arranged to perform the operations described with reference to some embodiments.

In some embodiments, antennas 301 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO embodiments, antennas 301 are separated to take advantage of spatial diversity.

Although UE 200 and eNB 300 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), etc.

Figure 4A:
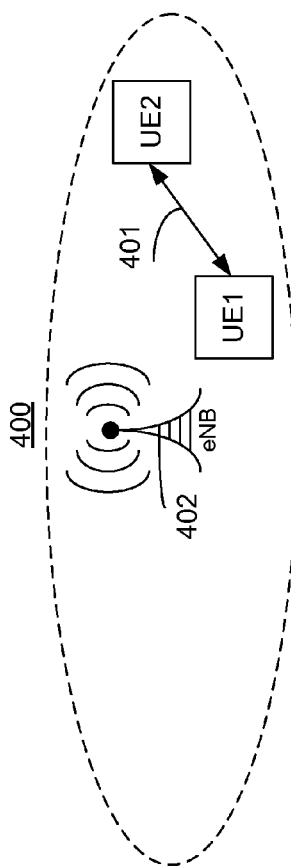
FIGS. 4A-B illustrate Device-to-Device (D2D) scenarios for In Coverage-Single Cell and In Coverage-Multi Cell with optimized DRX configurations, according to some embodiments of the disclosure.
Figure 4B:
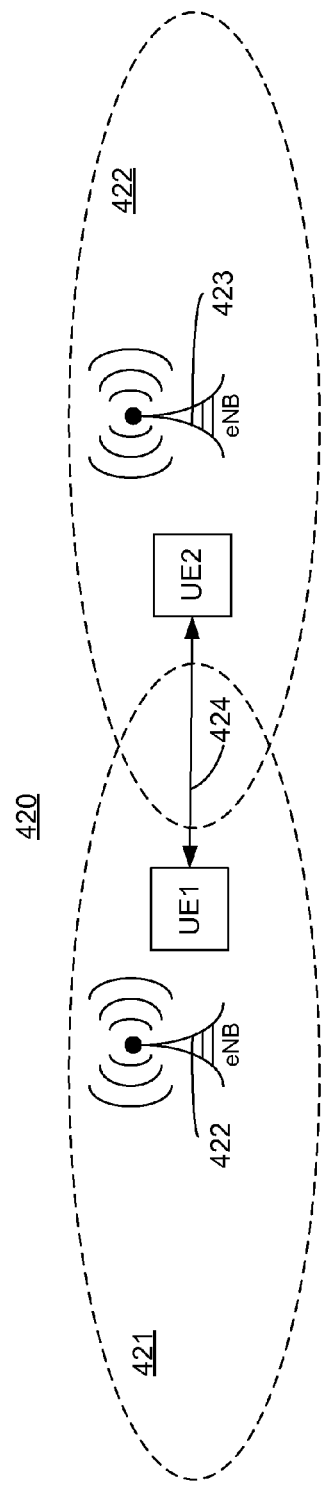

FIG. 4A illustrates a D2D scenario 400 for an In Coverage-Single Cell with optimized DRX configurations. FIG. 4B illustrates a D2D scenario 420 for an In Coverage-Multi Cell with optimized DRX configurations. It is pointed out that those elements of FIGS. 4A-B having the same reference numbers (or names) as the elements of any other figure can operate or function in any manner similar to that described, but are not limited to such.

In the $3^{rd}$ Generation Partnership Project (3GPP) Technical Report (TR) 36.843 Release 12 "Study on LTE Device to Device Proximity Services-Radio Aspects," four scenarios for D2D discovery are discussed. These include Out of Coverage, Partial Coverage, In Coverage-Single-Cell, and In-Coverage-Multi-Cell.

Scenario 400 is an illustration of an In Coverage-Single Cell where ProSe devices UE1 and UE2 are in coverage of LTE network range 401. In this example, an eNB (e.g., one of 102a/b/c/d) allocates and controls the discovery resource pool for UE1 and UE2 so that UE1 and UE2 may discover each other and communicate directly with one another (as shown by arrow 401).

Scenario 420 is an illustration of an In Coverage-Multi Cell where ProSe capable devices UE1 and UE2 are in coverage of two LTE network ranges 421 and 422, respectively. In this example, eNBs 422 and 423 (e.g., one of 102a/b/c/d) allocates and controls discovery resource pool for UE1 and UE2 so that UE1 and UE2 may discover each other and communicate directly with one another (as shown by arrow 424).

For the sake of simplicity, power savings by optimizing DRX configurations is described with reference to FIG. 4A. The same description can be extended to other In Coverage scenarios. Referring back to FIG. 4A, in some embodiments, in the case of UE1 and/or UE2 are capable of listening to PDCCH and receiving/transmitting D2D discovery signal simultaneously from eNB 402, DRX can be optimized to increase power savings at the UEs (UE1 and UE2). For example, DRX is optimized by eNB 402 to avoid long sleep or long DRX cycle during DOD). In some embodiments, the optimized DRX configuration is selected by eNB 402 per UE and conveyed to the UEs (i.e., UE2 and UE2) in a downlink RRC reconfiguration message. Once UE1 and UE2 and eNB 402 know the DRX parameters/timers for the respective UEs, the UEs and eNB 402 run these timers separately at their respective ends. Since UE1/2 and eNB 402 are time aligned/synchronized in the LTE network (during Connected mode), their respective timers start and expire at the same time.

In some embodiments, DRX ON duration is extended by eNB 402 to be equal to DOD. In some embodiments, duration of the DRX ON duration and duration of the DRX Inactivity Timer are extended by eNB 402 so that the sum of the DRX ON duration and the DRX Inactivity Timer duration is substantially equal to the DOD. In some embodiments, the DRX is configured by eNB 402 such that a UE is active during the DOD due to one of: the UE being in the DRX ON duration, the DRX Inactivity Timer is running, or the DRX short cycle is running.

Figure 5:
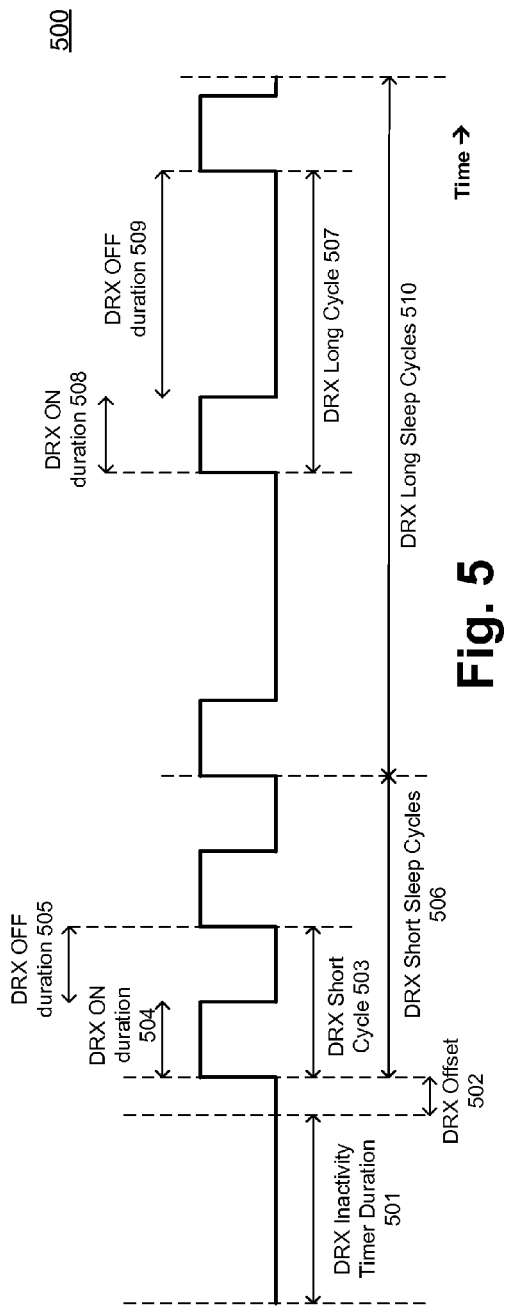
FIG. 5 illustrates a DRX configuration having short and long sleep cycles, according to some embodiments of the disclosure.

FIG. 5 illustrates DRX configuration 500 having short and long sleep cycles. It is pointed out that those elements of FIG. 5 having the same reference numbers (or names) as the elements of any other figure can operate or function in any manner similar to that described, but are not limited to such.

As discussed above, DRX is a method by which a UE can switch off its receiver for a period of time, thereby saving energy, while remaining in the RRC Connected state (or mode). The DRX in the Connected mode is a power saving mechanism in the LTE network. Since the DRX saves battery power of the UE, usually at the expense of a potential increase in latency, an optimization is needed to find the best tradeoff between latency and power saving.

When a UE powers up or when a packet is received by a UE from an eNB, the DRX Inactivity Timer begins to count for a duration referred to here as DRX Inactivity Timer Duration 501 before the eNB enters the DRX cycles for power savings. One reason for Duration 501 is to wait for any other packet transmission by the UE, which may delay starting of the power saving DRX cycles. After DRX Inactivity Timer Duration 501 expires, a short time defined as DRX Offset 502 (also referred to as drx_StartOffset) is used to align multiple users so that they start at the same time. The drx_StartOffset is used to obtain starting sub frame number for the DRX cycle. It is one of the conditions to be met to get into the DRX. The value of DRX Offset 502 is dependent on values of Short DRX cycle or Long DRX cycle. DRX Offset 502 usually helps many users to start DRX cycles at same time, for example, by defining same cycles. The value of DRX parameters also depends on the Quality of Service (QOS), packet arrival characteristics, and application services.

The DRX cycle comprises of active and sleep durations. DRX configuration 500 shows two types of DRX cycles—DRX Short Sleep Cycles 506 and DRX Long Sleep Cycles 510. DRX Short Sleep Cycles 506 may be optional. DRX Short Sleep Cycles 506 includes one or more DRX Short cycles (e.g., DRX Short Cycle 503). In each DRX Short Cycle, there is DRX ON duration 504 and a DRX OFF duration 505. While FIG. 5 illustrates substantially equal times for DRX ON duration 504 and DRX OFF duration 505, these durations can be different. For example, DRX OFF duration 505 may be longer than DRX ON duration 504 or vice versa.

DRX Long Sleep Cycles 510 includes one or more DRX Long cycles (e.g., DRX Long Cycle 507). In each DRX Long Cycle 507, there is DRX ON duration 508 and a DRX OFF duration 509. In DRX Long Cycle, DRX OFF duration 509 is longer than DRX ON duration 508. During the DRX OFF duration 509, the UE saves power. When the UE is sleeping (i.e., in low power mode) during DRX OFF duration 509, the eNB cannot break the DRX cycle for the downlink and has to wait for the next DRX ON duration to break the DRX cycle. However, the UE can break the DRX cycles for the uplink.

In the In-coverage scenario 400, as illustrated with reference to FIG. 4A, where ProSe capable devices UE1 and UE2 are in coverage of the LTE network, LTE eNB(s) is (are) responsible to allocate and control the discovery resource pool for UEs UE1 and UE2. According to Chairman's notes of the 3GPP RAN2#83 meeting, the transmission of discovery messages should be supported in the Idle mode and in the Connected mode. In both modes, the UE needs to be allowed by the network (NW) to transmit these discovery messages. Further, according to the Chairman's notes of the 3GPP RAN2#83 meeting, the NW needs to be in control of the resources and transmission modes (i.e., Connected and/or Idle) that the UEs may use to transmit the discovery signals (e.g., PSS and SSS).

Here, Type 1 and Type 2 are various approaches to allocate the discovery resource pool by the eNB as discussed and agreed in the Chairman's notes of the 3GPP RAN1#73. Type 1 is a discovery procedure where resources for the UE for the discovery signal transmission are allocated on a non UE specific basis. (Note, Resources can be for all UEs or group of UEs). Type 2 is a discovery procedure where resources for the discovery signal transmission are allocated on a per UE specific basis. Type 2 is further categorized as Type 2A and Type 2B. In Type 2A, resources for the UE are allocated for each specific transmission instance of the discovery signals. In Type 2B, resources are semi-persistently allocated for the discovery signal transmission.

As described in the Chairman's notes of the 3GPP RAN2 meeting#85 of February 2014, Type 1 and Type 2B are the working baseline. For in-coverage discovery, the eNB may provide in SIB; a) a radio resource pool for discovery reception of Type 2B; and b) a radio resource pool for discovery transmission and reception in case of Type 1. As further described in the Chairman's notes of the 3GPP RAN2 meeting#85 of February 2014, receiving UEs monitor both Type 1 and Type 2B discovery resources. Resource allocation in Type 1 and Type 2B is expected to be done in a semi-static manner as illustrated with reference to FIG. 6.

Figure 6:
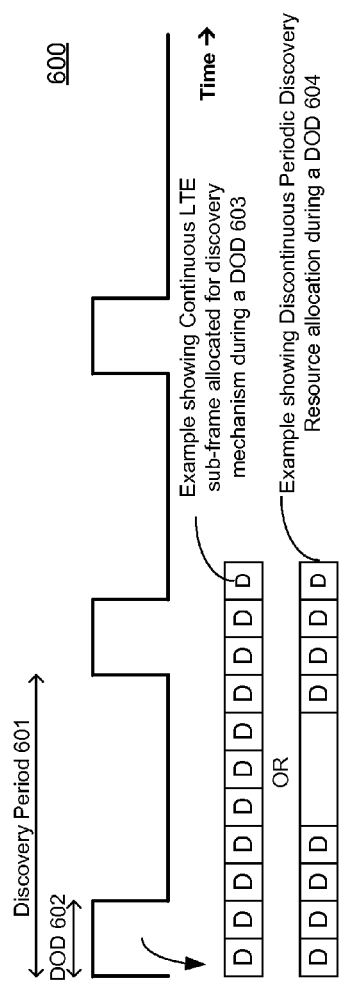
FIG. 6 illustrates a timing diagram for semi-static periodic discovery resource pool allocation for D2D Discovery Mechanism, according to some embodiments of the disclosure.

FIG. 6 illustrates timing diagram 600 for semi-periodic discovery resource pool allocation for the D2D Discovery Mechanism, according to some embodiments. It is pointed out that those elements of FIG. 6 having the same reference numbers (or names) as the elements of any other figure can operate or function in any manner similar to that described, but are not limited to such.

The term "semi-static" periodic discovery resource pool allocation here generally refers to as the discovery periodicity and/or resource amount in each DOD. Discovery periodicity (or period) 601 can be changed by the eNB over time. Here, after every Discovery Period 601, DOD 602 is provided to the UE by the eNB. Several LTE sub-frames 603 (here referred to as 'D') are allocated for discovery mechanism in each DOD 602. In some cases, in each DOD 602, periodic discovery resource pool 604 are allocated for discovery mechanism. During any DOD, all or some of the LTE sub-frames 603 are assigned for discovery. Here, the lower part of FIG. 6 illustrates possible actual sub-frame allocation during the DOD (e.g., continuous or discontinuous).

During the discovery time duration, which occurs periodically in order of seconds, the ProSe capable UEs will be either transmitting or receiving the discovery signals. Therefore, typically, D2D UEs are active during DOD 602 irrespective of the LTE Idle or Connected mode DRX States (i.e., ProSe capable UEs are active during the durations when the discovery resource pool is allocated by the eNB, whether these ProSe capable UEs are in the power saving DRX sleep state).

Figure 7:
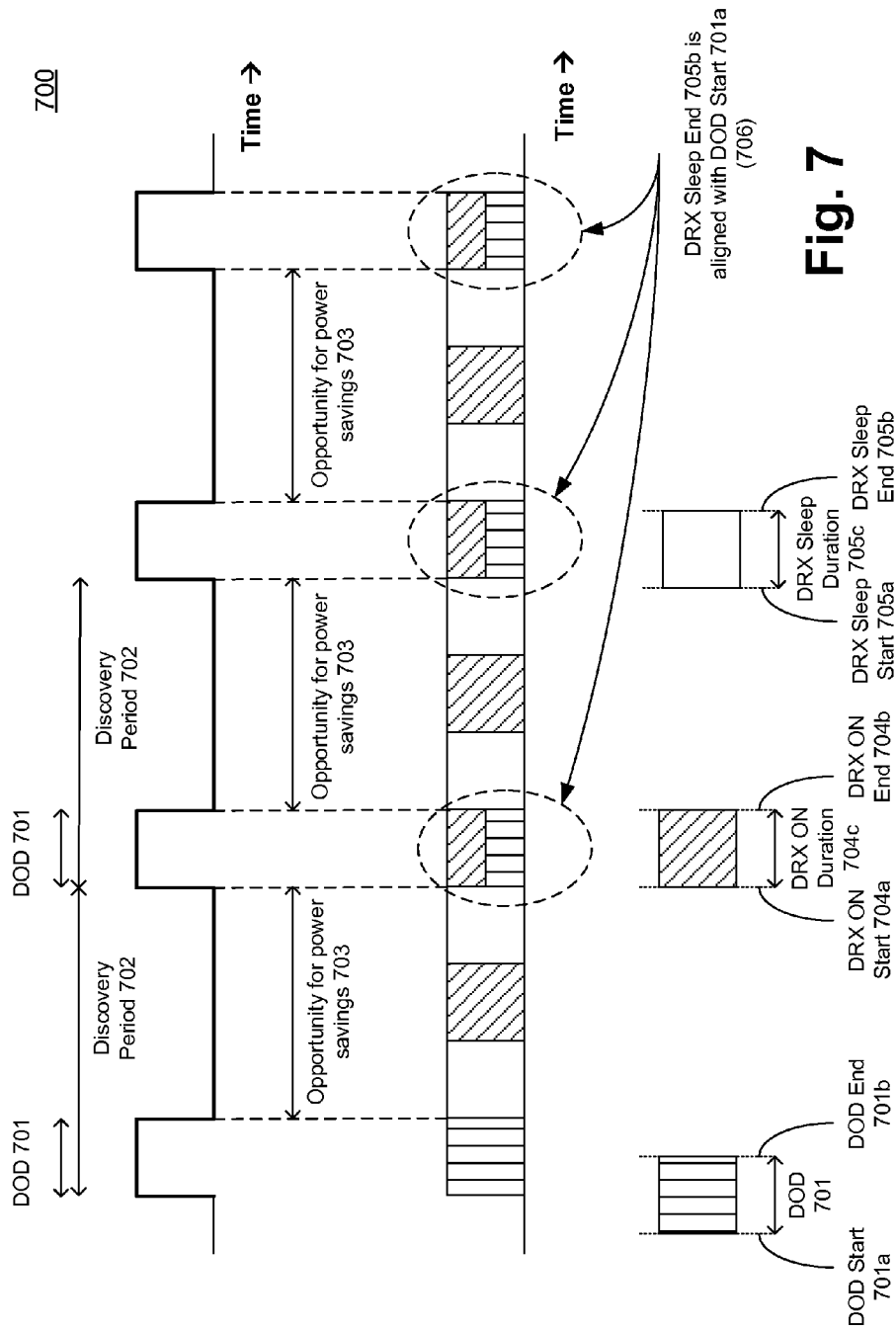
FIG. 7 illustrates a timing diagram showing DRX configuration alignment with Discovery Resource Allocation for Proximity Service (ProSe) Capable UEs, according to some embodiments of the disclosure.

FIG. 7 illustrates timing diagram 700 showing the DRX configuration alignment with Discovery Resource Allocation for ProSe Capable UEs, according to some embodiments of the disclosure. It is pointed out that those elements of FIG. 7 having the same reference numbers (or names) as the elements of any other figure can operate or function in any manner similar to that described, but are not limited to such.

Here, x-axis is time and y-axis is logical high and low. The top waveform is similar to timing diagram 600. Here, Discovery Period cycles are shown having DOD 701 and Discovery Period 702. The region 703 between DODs provides the opportunity for power savings. In some embodiments, when a UE 104 (e.g., UE1 and/or UE2) is capable of listening to the PDCCH and receiving/transmitting D2D discovery signals simultaneously, additional power savings can be realized at the UE.

The waveform below the top waveform illustrates the start and end points of DOD, DRX ON Duration, and DRX Sleep Duration. For example, DOD 701 (represented by the vertical patterned region) has DOD Start 701*a* and DOD End 701*b*; DRX ON Duration 704*c* (represented by angled patterned region) has DRX ON Start 704*a* and DRX ON End 704*b*; and DRX Sleep Duration 705*c* (represented by blank region) has DRX Start 705*a* and DRX Sleep End 705*b*.

In some embodiments, power savings at UE 104 are realized when DRX ON duration 704*c* is extended to be substantially equal (or exactly equal to) to DOD 701 as indicated by dotted region 706. In this case, the eNB aligns DRX Sleep End 705*b* with the beginning of DOD Start 701*a*. In such embodiments, when the eNB determines that DRX ON duration 704*c* is colliding with DOD 701, then DRX ON durations are extended till the end of DOD 701.

In some embodiments, power savings at UE 104 are realized, by extending the duration of DRX ON duration 704*c* and duration of DRX Inactivity Timer 501 so that the sum of DRX ON duration 704*c* and the DRX Inactivity Timer duration 501 is to be substantially equal to DOD 701. In some embodiments, power savings at UE 104 are realized, by configuring DRX such that UE 104 operates in DRX ON duration 704*c*, DRX Inactivity Timer 501 is running, or DRX short cycle 503 is running during DOD 701. In some embodiments, long sleep or long DRX cycles are avoided during the DOD.

In some embodiments, the DRX configuration is modified by the eNB in such a way that UEs 104 are mostly active during the DOD. In some embodiments, long DRX cycle is aligned with the start of DOD. In some embodiments, such alignment is performed by making the long DRX cycles and the discovery periodicity integer multiples of each other and by adjusting the drx_StartOffset.

In some embodiments, a Discovery specific DRX configuration is used during the DOD to keep the UE mostly active which can help in reducing latency of potential downlink traffic during this period. In some embodiments, the DRX configuration for this period is adjusted to make DRX ON duration 704*c* equal to DOD 701. In alternative embodiments, the DRX configuration for this period contains either short cycles 506 or a very long DRX Inactivity timer duration 501 (e.g., equal to the length of DOD 701).

In some embodiments, ProSe capable UEs 104 (e.g., UE1 and UE2) can optimize the DRX configuration to maximize the UE power savings. For example, ProSe capable UEs 104 may define very large long DRX cycles between DODs. In such an example, discovery specific DRX configuration for this period can have large long DRX cycles (where, the exact values for the length of the DRX cycles depends on applications running at these UE5), where these long DRX cycles and Discovery resource periodicity are integer multiples of each other.

FIGS. 8A-B illustrate uplink RRC messages 800 and 820 for ProSe capable UE 104 (e.g., UE1 and/or UE2) to request or indicate its preference for discovery specific DRX Configuration, according to some embodiments of the disclosure. It is pointed out that those elements of FIGS. 8A-B having the same reference numbers (or names) as the elements of any other figure can operate or function in any manner similar to that described, but are not limited to such.

In some embodiments, ProSe capable UE 104 (e.g., UE1 and/or UE2) may send its preference to be configured with discovery specific DRX by sending either a RRC IE or a MAC CE to the network/eNB. In some embodiments, a new RRC message can be defined to send the RRC IE carrying preference to be configured with the discovery specific DRX. In this example, a new RRC message is described for the 3GPP Release 12 as shown in UL-DCCH-Message 800. The UL-DCCH-Message is an uplink (UL) Dedicated Control Channel (DCCH) message. UL-DCCH-Message class is a set of RRC messages that may be sent from the UE to the E-UTRAN or from the Relay Node (RN) to the E-UTRAN on the uplink UL DCCH logical channel.

In some embodiments, under the messageClassExtension CHOICE (which may be nested choices), a new message "ueAssitanceInformation-r12" 801 may be defined to send the RRC IE carrying a preference to be configured with the discovery specific DRX. In some embodiments, the UEAssitanceInformation message is used for the indication of UE assistance information to the eNB. Here, the signaling radio bearer is SRB1, RLC-SAP is AM, Logical channel is DCCH, and Direction is UE to E-UTRAN. Details of the UEAssitanceInformation are provided in code 820 of FIG. 8B.

FIG. 9 illustrates uplink RRC Information Element (IE) message 900 for ProSe capable UE 104 (e.g., UE1 and/or UE2) to request or indicate its preference to eNB 102*a/b/c/d* for discovery specific DRX Configuration, according to some embodiments of the disclosure. It is pointed out that those elements of FIG. 9 having the same reference numbers (or names) as the elements of any other figure can operate or function in any manner similar to that described, but are not limited to such.

In some embodiments, a new preference IE can be included in the existing UEAssistanceInformation message as described below. In this example, a new preference IE message 901 is described for the 3GPP Release 12 as a new field in the existing UEAssistanceInformation-r11 to send the preference of the UE to be configured with a discovery specific DRX. In this example, UEAssistanceInformation-r11 is reused.

Figure 10:
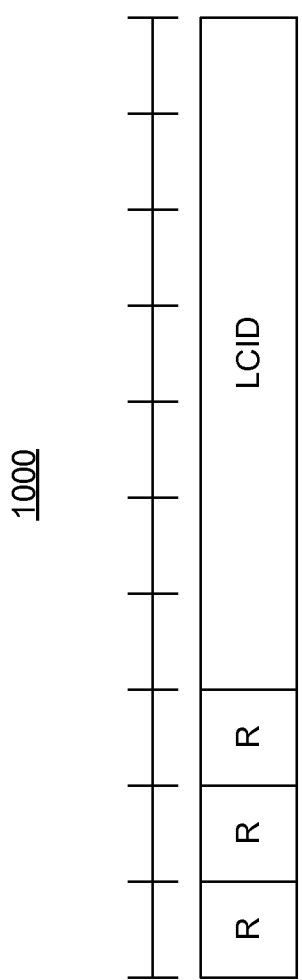
FIG. 10 illustrates a Media Access Control (MAC) Control Element (CE) Header for a ProSe UE to send discovery specific DRX preference to an eNB, according to some embodiments of the disclosure.

FIG. 10 illustrates MAC CE 1000 Header for ProSe capable UE 104 (e.g., UE1 and/or UE2) to send discovery specific DRX preference to eNB 102*a/b/c/d*, according to some embodiments of the disclosure. It is pointed out that those elements of FIG. 10 having the same reference numbers (or names) as the elements of any other figure can operate or function in any manner similar to that described, but are not limited to such.

In some embodiments, a new MAC CE 1000 is defined in the uplink for ProSe capable UE 104 (e.g., UE1 and/or UE2) to send its preference for discovery specific DRX configuration (e.g., to align the DRX ON with the DOD) to eNB 102a/b/c/d. MAC CE 1000 comprises reserved bits 'R' and Logical Channel ID (LCID). In some embodiments, reserved bits 'R' in MAC CE 1000 can be used to provide UE preference to the eNB. In some embodiments, a new LCID from the reserved LCID pool (e.g., 01011-11000) for the uplink shared Channel (UL-SCH) can be used to identify MAC CE 1000.

Figure 11:
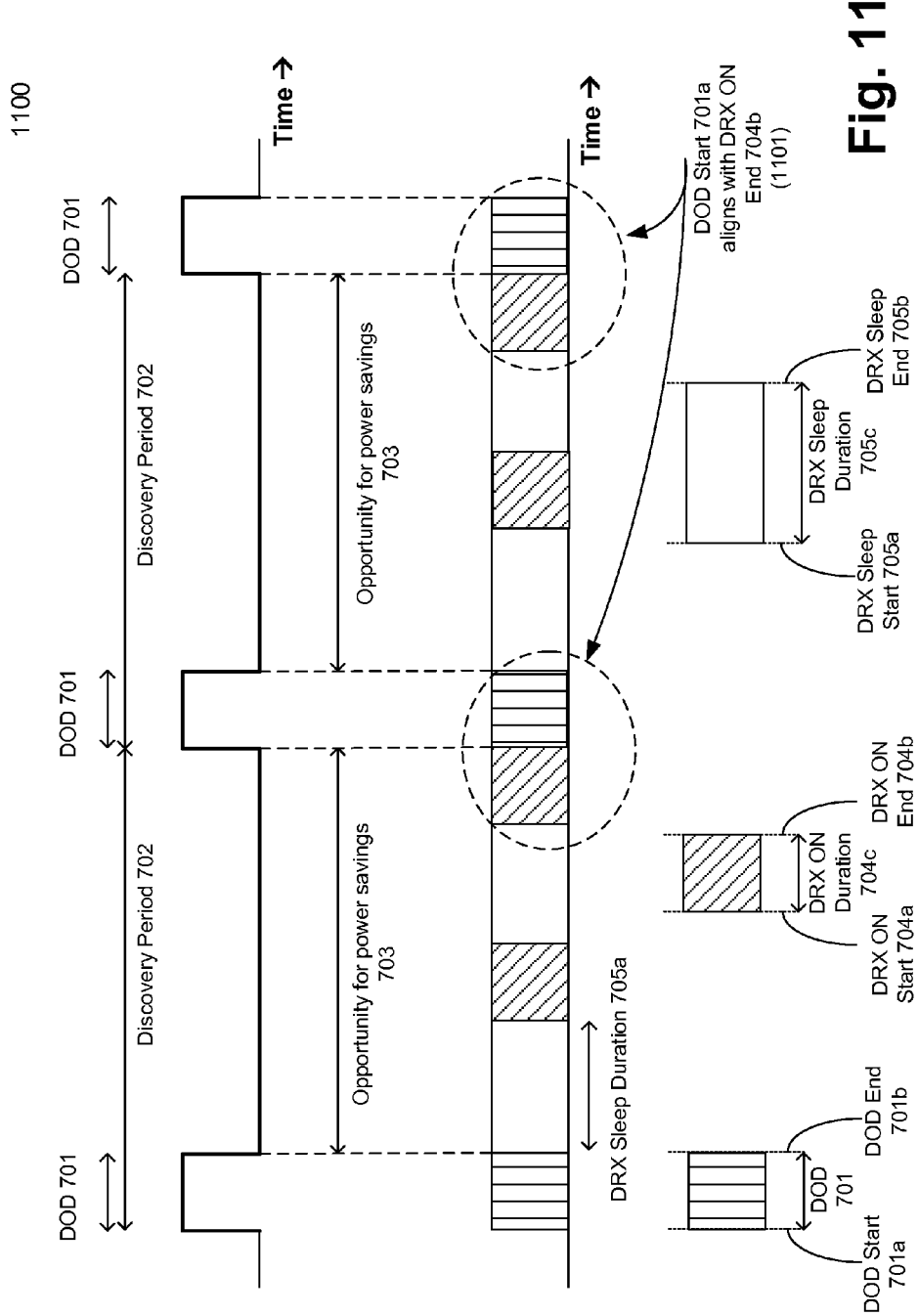
FIG. 11 illustrates a timing diagram showing DRX configuration alignment with Discovery Resource Allocation for ProSe Capable UEs, according to some embodiments of the disclosure.

FIG. 11 illustrates timing diagram 1100 showing DRX configuration alignment with Discovery Resource Allocation for ProSe Capable UEs 104 (e.g., UE1 and/or UE2), according to some embodiments of the disclosure. It is pointed out that those elements of FIG. 11 having the same reference numbers (or names) as the elements of any other figure can operate or function in any manner similar to that described, but are not limited to such. FIG. 11 is described with reference to FIG. 7.

In some embodiments, when ProSe UE 104 is not capable of receiving and transmitting at the same time, or receiving at two different frequencies at the same time, then eNB (e.g., 102a/b/c/d) can configure the DRX configuration for power savings for the ProSe UE (e.g., UE1 and/or UE2) such that DRX ON duration 704c is aligned right before the DOD durations 701. In this example, DOD start 701a aligns with DRX ON End 704b as shown by dotted region 1101.

For the D2D devices (e.g., UE1 and UE2), it may be difficult to decode both the PDCCH and D2D communications at the same time. So in some embodiments, DRX ON durations are aligned either before or after the D2D DOD period. In some embodiments, this alignment can be done via RRC message 800 and preference IE 820 as described with reference to FIGS. 8A-B. In some embodiments, this alignment can be done via MAC CE 1000 as described with reference to FIG. 9.

Figure 12:
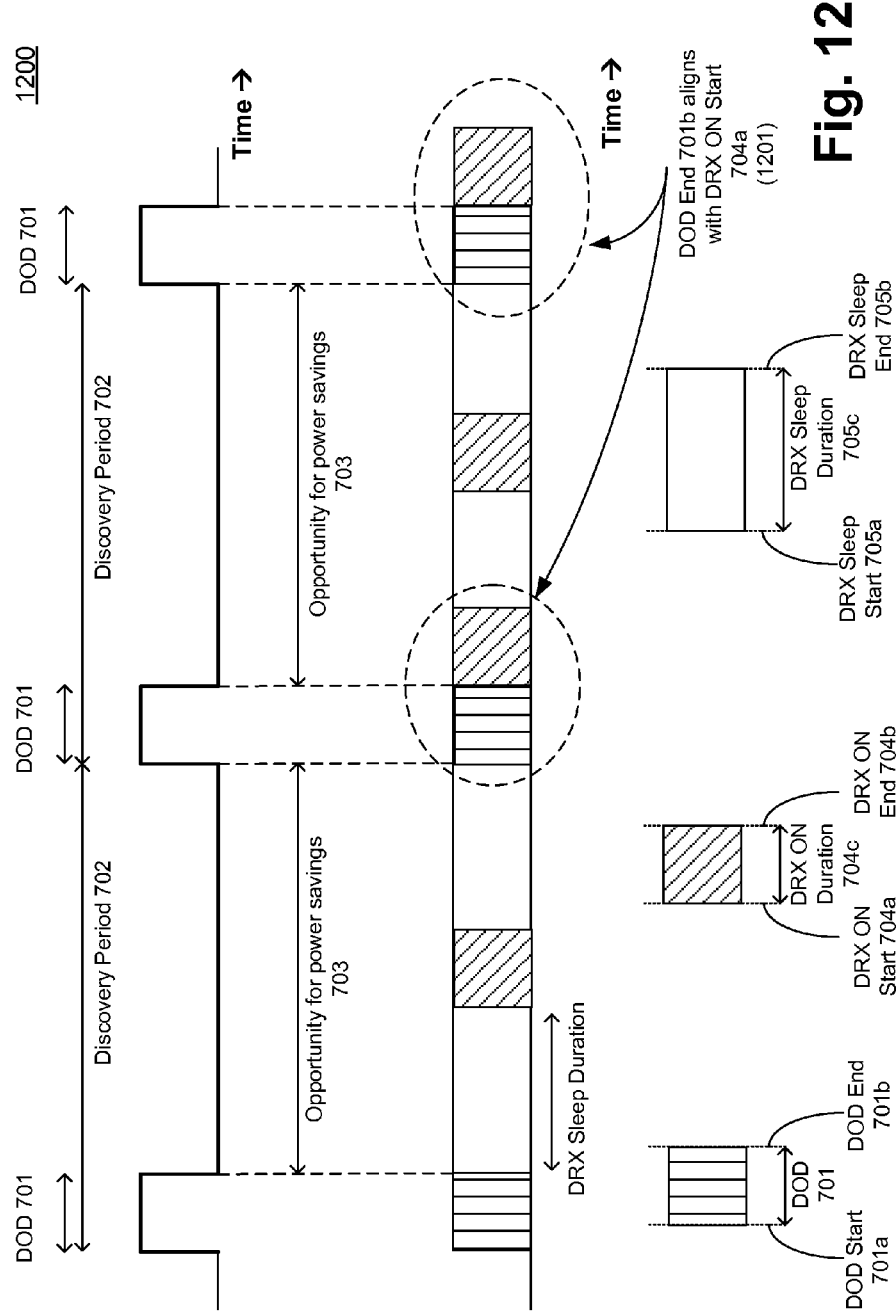
FIG. 12 illustrates a timing diagram showing DRX configuration alignment with Discovery Resource Allocation for ProSe Capable UEs, according to some embodiments of the disclosure.

FIG. 12 illustrates timing diagram 1200 showing DRX configuration alignment with Discovery Resource Allocation for ProSe Capable UEs, according to some embodiments of the disclosure. It is pointed out that those elements of FIG. 12 having the same reference numbers (or names) as the elements of any other figure can operate or function in any manner similar to that described, but are not limited to such.

In some embodiments, when ProSe UE 104 is not capable of receiving and transmitting at the same time, or receiving at two different frequencies at the same time, then eNB (e.g., 102a/b/c/d) can configure the DRX configuration for power savings for the ProSe UE (e.g., UE1 and/or UE2) such that DRX ON duration 704c is aligned right after the DOD durations 701. In this example, DOD End 701b aligns with DRX ON Start 704a as shown by dotted region 1201. In some embodiments, this alignment can be done via RRC message 800 and preference IE 820 as described with reference to FIGS. 8A-B. In some embodiments, this alignment can be done via MAC CE 1000 as described with reference to FIG. 9.

Figure 13:
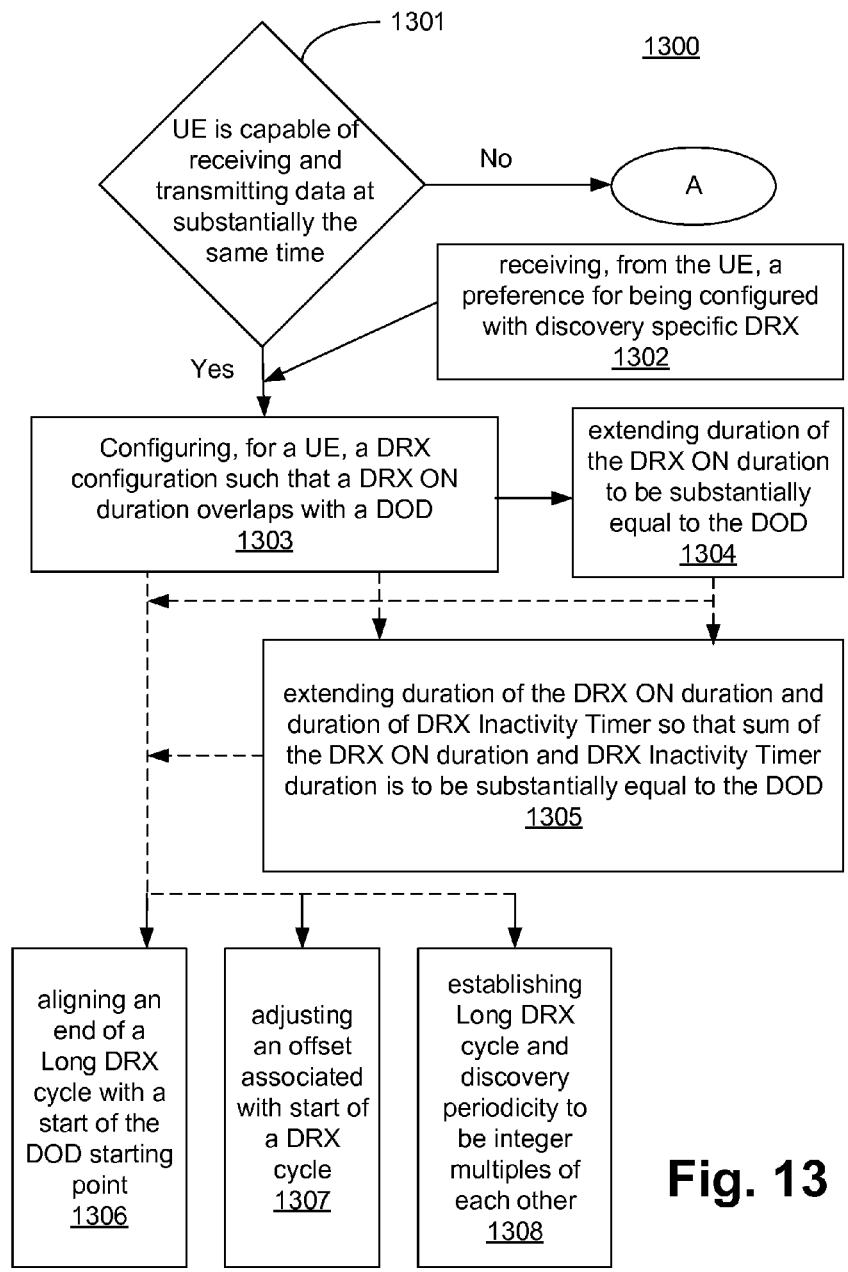
FIGS. 13-14 illustrate flowcharts of a method to configure DRX configuration with Discovery Resource Allocation for ProSe Capable UEs, according to some embodiments of the disclosure.
Figure 14:
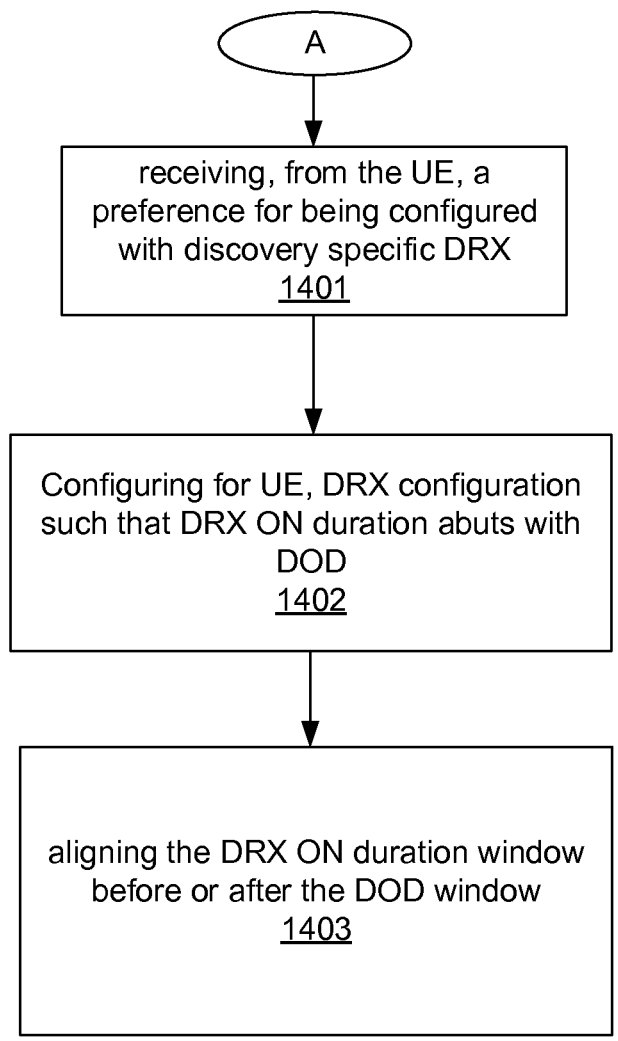

FIGS. 13-14 illustrate flowcharts 1300 and 1400 of a method to configure DRX configuration with Discovery Resource Allocation for ProSe Capable UEs, according to some embodiments of the disclosure. It is pointed out that those elements of FIGS. 13-14 having the same reference numbers (or names) as the elements of any other figure can operate or function in any manner similar to that described, but are not limited to such.

Although the blocks in the flowchart with reference to FIGS. 13-14 are shown in a particular order, the order of the actions can be modified. Thus, the illustrated embodiments can be performed in a different order, and some actions/blocks may be performed in parallel. Some of the blocks and/or operations listed in FIGS. 13-14 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 1301, a determination is made by eNB (e.g., 102a/b/c/d) about ProSe UE 104 whether the ProSe UE is capable of receiving and transmitting data at substantially the same time, or whether the ProSe UE is capable of receiving data at two different frequencies at the same time. If ProSe UE 104 is capable of receiving and transmitting data at substantially the same time, or if the ProSe UE is capable of receiving data at two different frequencies at the same time, then the process proceeds to block 1303. In some embodiments, UE 104 is capable of providing preference for discovery specific DRX. Accordingly, in some embodiments, as described with reference to block 1302, the eNB receives a preference for being configured with discovery specific DRX configuration. In some embodiments, this preference can be sent by UE 104 via RRC message 800 and preference IE 820 as described with reference to FIGS. 8A-B. In some embodiments, this preference can be send by UE 104 via MAC CE 1000 as described with reference to FIG. 9.

Referring back to FIG. 13, at block 1304, the eNB configures DRX by extending duration of the DRX ON duration 704c to be substantially equal to the DOD 701 as described with reference to FIG. 7. Referring back to FIG. 13, at block 1305, in alternative embodiments, the eNB configures the DRX by extending duration of the DRX ON duration and duration of DRX Inactivity timer 501 so that the sum of DRX ON duration 704c and DRX Inactivity Timer duration 501 is to be substantially equal to the DOD 701.

Blocks 1306, 1307, and 1308 are alternate ways of configuring DRX for more power savings at the UE, according to some embodiments. Blocks 1306, 1307, and/or 1308 may be executed along with block 1303. In some embodiments, blocks 1306, 1307, and 1308 are performed for the same UE. At block 1306, eNB aligns an end of a Long DRX cycle 705b with a start of the DOD starting point 701a. At block 1307, the eNB adjusts an offset 502 associated with the start of a DRX cycle 1307. At block 1308, the eNB establishes a Long DRX cycle 507 and discovery periodicity 702 to be integer multiples of each other.

In some embodiments, if ProSe capable UE 104 is incapable of receiving and transmitting data at substantially the same time, or if the ProSe UE is incapable of receiving data at two different frequencies at the same time, then the process proceeds to block 1401 of FIG. 14 (see transmission block 'A'). Blocks 1401-1403 are described with reference to FIGS. 11-12. Referring back to FIG. 14, in some embodiments, at block 1401, the eNB receives a preference for being configured with discovery specific DRX configuration. In some embodiments, this preference can be sent by UE 104 via RRC message 800 and preference IE 820 as described with reference to FIGS. 8A-B. In some embodiments, this preference can be send by UE 104 via MAC CE 1000 as described with reference to FIG. 9.

Referring back to FIG. 14, at block 1402, the eNB configures the DRX configuration for ProSe capable UE 104 such that DRX ON duration 704c abuts with DOD 701. In some embodiments, as described with reference to block 1403, the eNB aligns the DRX ON duration window before or after the DOD with as discussed with reference to FIGS. 11-12.

FIG. 15 illustrates a UE 1600 with apparatus for providing an eNB a preference for being configured with discovery specific DRX, according to some embodiments of the disclosure. It is pointed out that those elements of FIG. 15 having the same reference numbers (or names) as the elements of any other figure can operate or function in any manner similar to that described, but are not limited to such.

UE 1600 may be a smart device, smart phone, tablet, or a computer system or a SoC with apparatus for providing an eNB a preference for being configured with discovery specific DRX, according to some embodiments of the disclosure. FIG. 16 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes a first processor 1610 with apparatus for providing an eNB a preference for being configured with discovery specific DRX, according to some embodiments discussed. Other blocks of the computing device 1600 may also include the apparatus for providing an eNB a preference for being configured with discovery specific DRX of some embodiments. The various embodiments of the present disclosure may also comprise a network interface within 1670 such as a wireless interface so that a system embodiment may be incorporated into a wireless device, for example, cell phone or personal digital assistant.

In some embodiments, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In some embodiments, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

In some embodiments, computing device 1600 comprises display subsystem 1630. Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

In some embodiments, computing device 1600 comprises I/O controller 1640. I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In some embodiments, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In some embodiments, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 1600 includes Connectivity 1670. Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

In some embodiments, computing device includes Peripheral connections 1680. Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an eNB is provided which comprises: a first logic to determine whether the UE is capable of receiving and transmitting data at substantially the same time or receiving data at two different frequencies at the same time; and a second logic to configure for the UE a DRX configuration such that a DRX ON duration overlaps with a DOD according to the determination from the first logic. In some embodiments, the second logic is operable to extend a duration of the DRX ON duration to be substantially equal to the DOD during a DOD period.

In some embodiments, the second logic is operable to apply normal DRX ON duration during a non-DOD period. In some embodiments, the second logic is operable to extend duration of the DRX ON duration and duration of DRX Inactivity Timer so that sum of the DRX ON duration and DRX Inactivity Timer duration is to be substantially equal to the DOD. In some embodiments, the second logic is operable to configure DRX configuration such that the UE is active due to one of: UE being in DRX ON duration, DRX inactivity Timer is running, or DRX short cycle is running during the DOD.

In some embodiments, the eNB comprises logic to align an end of a Long DRX cycle with a start of the DOD starting point. In some embodiments, the logic to make Long DRX cycle and discovery periodicity integer multiples of each other. In some embodiments, the eNB comprises logic to adjust an offset associated with start of DRX cycle. In some embodiments, the eNB comprises logic to receive, from the UE, a preference for being configured with discovery specific DRX. In some embodiments, the preference is received by one of: RRC message IE, or MAC CE. In some embodiments, the eNB comprises logic to send the DRX configuration for the UE in a downlink RRC message.

In another example, an eNB is provided which comprises: a first logic to determine whether a UE is capable of receiving and transmitting data at substantially the same time; and a second logic to configure for the UE a DRX configuration such that a DRX ON duration window abuts with a DOD window according to the determination from the first logic. In some embodiments, the second logic is operable to align the DRX ON duration window before or after the DOD window.

In some embodiments, the eNB comprises logic to receive, from the UE, a preference for being configured with discovery specific DRX. In some embodiments, the UE is capable of identifying or deciding its need or preference for being configured with the discovery specific DRX. In some embodiments, the preference received by one of: RRC message IE, or MAC CE.

In another example, a machine readable storage media is provided having machine executable instructions, that when executed, cause one or more processors to perform an operation comprising: configuring, for a UE, a DRX configuration such that a DRX ON duration overlaps with a DOD. In some embodiments, the machine readable storage media has further machine executable instructions, that when executed, cause the one or processors to perform an operation comprising: determining whether the UE is capable of receiving and transmitting data at substantially the same time or receiving data at two different frequencies at the same time, and configuring the DRX configuration according to the determination.

In some embodiments, the machine readable storage media has further machine executable instructions, that when executed, cause the one or more processors to perform an operation comprising extending duration of the DRX ON duration to be substantially equal to the DOD. In some embodiments, the machine readable storage media has further machine executable instructions, that when executed, cause the one or more processors to perform an operation comprising extending duration of the DRX ON duration and duration of DRX Inactivity Timer so that sum of the DRX ON duration and DRX Inactivity Timer duration is to be substantially equal to the DOD.

In some embodiments, the machine readable storage media has further machine executable instructions, that when executed, cause the one or more processors to perform an operation comprising aligning an end of a Long DRX cycle with a start of the DOD starting point. In some embodiments, the machine readable storage media has further machine executable instructions, that when executed, cause the one or more processors to perform an operation comprising establishing Long DRX cycle and discovery periodicity to be integer multiples of each other.

In some embodiments, the machine readable storage media has further machine executable instructions, that when executed, cause the one or more processors to perform an operation comprising adjusting an offset associated with start of a DRX cycle. In some embodiments, the machine readable storage media has further machine executable instructions, that when executed, cause the one or more processors to perform an operation comprising receiving, from the UE, a preference for being configured with discovery specific DRX. In some embodiments, wherein the preference is received by one of: RRC message IE, or MAC CE.

In another example, a machine readable storage media is provided having further machine executable instructions, that when executed, cause one or more processors to perform an operation comprising configuring, for a UE, a DRX configuration such that a DRC ON duration abuts with a DOD. In some embodiments, the machine readable storage media has further machine executable instructions, that when executed, cause the one or more processors to perform an operation comprising aligning the DRX ON duration window before or after the DOD window. In some embodiments, the machine readable storage media has further machine executable instructions, that when executed, cause the one or more processors to perform an operation comprising receiving, from the UE, a preference for being configured with discovery specific DRX. In some embodiments, the preference received by one of: RRC message IE, or MAC CE.

In another example, a machine readable storage media is provided having machine executable instructions, that when executed, cause one or more processors to perform an operation comprising: configuring, for a UE, a DRX configuration such that a DRX ON duration ends before the start of a DOD. In some embodiments, configuring the DRX configuration comprises configuring the DRX configuration such that the DRX ON duration ends right before the start of the DOD if the UE is neither operable to listen to Physical Downlink Control Channel (PDCCH) nor operable to receive or transmit D2D discovery signal simultaneously.

In another example, a machine readable storage media is provided having machine executable instructions, that when executed, cause one or more processors to perform an operation comprising: configuring, for a UE, a DRX configuration such that a DRX ON duration start right after the end of a DOD. In some embodiments, wherein configuring the DRX configuration comprises configuring the DRX ON duration start right after the end of the DOD if the UE is neither operable to listen to a PDCCH nor operable to receive or transmit D2D discovery signal simultaneously.

In another example, a UE is provided which comprises: a first logic capable of identifying or deciding its need or preference for being configured with a discovery specific DRX; and a transmitter to transmit the preference or need to an eNB. In some embodiments, the transmitter is capable of transmitting data at substantially the same time. In some embodiments, the UE comprises a receiver which is capable of receiving data at substantially the same time or capable of receiving data at two different frequencies at the same time. In some embodiments, DRX configuration indicates that a DRX ON duration starts right after the end of a DOD.

In another example, an apparatus is provided means for configuring, for a UE, a DRX configuration such that a DRX ON duration overlaps with a DOD. In some embodiments, the apparatus comprises means for determining whether the UE is capable of receiving and transmitting data at substantially the same time or receiving data at two different frequencies at the same time, and configuring the DRX configuration according to the determination. In some embodiments, the apparatus comprises means for extending duration of the DRX ON duration to be substantially equal to the DOD. In some embodiments, the apparatus comprises means for extending duration of the DRX ON duration and duration of DRX Inactivity Timer so that sum of the DRX ON duration and DRX Inactivity Timer duration is to be substantially equal to the DOD.

In some embodiments, the apparatus comprises means for aligning an end of a Long DRX cycle with a start of the DOD starting point. In some embodiments, the apparatus comprises establishing Long DRX cycle and discovery periodicity to be integer multiples of each other. In some embodiments, the apparatus comprises means for adjusting an offset associated with start of a DRX cycle. In some embodiments, the apparatus comprises means for receiving, from the UE, a preference for being configured with discovery specific DRX. In some embodiments, the preference is received by one of: RRC message IE, or MAC CE.

In another example, an apparatus is provided which comprises: means for configuring, for a UE, a DRX configuration such that a DRC ON duration abuts with a DOD. In some embodiments, the apparatus comprises means for aligning the DRX ON duration window before or after the DOD window. In some embodiments, the apparatus comprises means for receiving, from the UE, a preference for being configured with discovery specific DRX. In some embodiments, the preference received by one of: RRC message IE, or MAC CE.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An Evolved Node-B (eNB) to communicate with a User Equipment (UE) on a network, the eNB comprising:
one or more processors to:
determine whether the UE is capable of receiving and transmitting data at substantially the same time or receiving data at two different frequencies at the same time;
establish for the UE a Discontinuous Reception (DRX) configuration such that a DRX ON duration overlaps with a discovery opportunity duration (DOD) according to the determination;
extend the DRX ON duration; and
adjust an offset associated with start of DRX cycle; and
a memory for storing operations and arranged to perform the operations with the one or more processors.

2. The eNB of claim 1, wherein the DRX ON duration is extended to be substantially equal to the DOD during a DOD period.

3. The eNB of claim 1, wherein the one or more processors are further to apply normal DRX ON duration during a non-DOD period.

4. The eNB of claim 1, wherein the DRX ON duration is extended so that a sum of the DRX ON duration and a DRX Inactivity Timer duration is to be substantially equal to the DOD.

5. The eNB of claim 1, wherein the one or more processors are further to establish DRX configuration such that the UE is active due to one of: UE being in DRX ON duration, DRX inactivity Timer is running, or DRX short cycle is running during the DOD.

6. The eNB of claim 1, wherein the one or more processors are further to align an end of a Long DRX cycle with a start of the DOD starting point.

7. The eNB of claim 1, wherein the one or more processors are further to make a Long DRX cycle and a discovery periodicity integer multiples of each other.

8. The eNB of claim 1, wherein the one or more processors are further to receive, from the UE, a preference for being configured with discovery specific DRX.

9. The eNB of claim 8, wherein the preference is received by one of:
Radio Resource Control (RRC) message Information Element (IE), or Medium Access Control (MAC) control element (CE).

10. The eNB of claim 1, wherein the one or more processors are further to send the DRX configuration for the UE in a downlink Radio Resource Control (RRC) message.

11. The eNB of claim 1, wherein the one or more processors are to establish the Discontinuous Reception (DRX) configuration if the UE is determined to be capable of receiving and transmitting data at substantially the same time or receiving data at two different frequencies at the same time.

12. The eNB of claim 1, wherein the one or more processors are further to align the DRX ON duration window before or after the DOD window.

13. An Evolved Node-B (eNB) to communicate with a User Equipment (UE) on a network, the eNB comprising:
one or more processors to:
determine whether a User Equipment (UE) is capable of receiving and transmitting data at substantially the same time;
establish for the UE a Discontinuous Reception (DRX) configuration such that a DRX ON duration window abuts with a discovery opportunity duration (DOD) window according to the determination; and
align the DRX ON duration window before or after the DOD window, and
a memory for storing operations and arranged to perform the operations with the one or more processors.

14. The eNB of claim 13, wherein the one or more processors are further to receive, from the UE, a preference for being configured with discovery specific DRX.

15. The eNB of claim 14 wherein the UE is capable of identifying or deciding its need or preference for being configured with the discovery specific DRX.

16. The eNB of claim 14, wherein the preference received by one of:
Radio Resource Control (RRC) message Information Element (IE), or
Medium Access Control (MAC) control element (CE).

17. The eNB of claim 13, wherein the one or more processors are to establish the Discontinuous Reception (DRX) configuration if the UE is determined to be capable of receiving and transmitting data at substantially the same time.

18. The eNB of claim 13, wherein the one or more processors are further to adjust an offset associated with start of DRX cycle.

19. A non-transitory machine readable storage media having machine executable instructions, that when executed, cause one or more processors to perform an operation comprising:
determining, for an Evolved Node-B (eNB), whether a User Equipment (UE) is capable of receiving and transmitting data at substantially the same time or receiving data at two different frequencies at the same time;
establishing a Discontinuous Reception (DRX) configuration such that a DRX ON duration abuts with a discovery opportunity duration (DOD) according to the determination; and
aligning the DRX ON duration window before or after the DOD window.

20. The machine readable storage media of claim 19 having further machine executable instructions, that when executed, cause the one or more processors to perform an operation comprising receiving, from the UE, a preference for being configured with discovery specific DRX.

21. The machine readable storage media of claim 20, wherein the preference received by one of:
   Radio Resource Control (RRC) message Information Element (IE), or
   Medium Access Control (MAC) control element (CE).

22. The machine readable storage media of claim 19 having further machine executable instructions, that when executed, cause the one or more processors to perform an operation comprising adjusting an offset associated with start of a DRX cycle.

* * * * *